(12) United States Patent
Chen et al.

(10) Patent No.: US 7,917,351 B2
(45) Date of Patent: *Mar. 29, 2011

(54) LANGUAGE CONVERTER WITH ENHANCED SEARCH CAPABILITY

(75) Inventors: Yen-Fu Chen, Austin, TX (US); John W. Dunsmoir, Round Rock, TX (US); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/389,806

(22) Filed: Feb. 20, 2009

(65) Prior Publication Data

US 2009/0157379 A1    Jun. 18, 2009

Related U.S. Application Data

(63) Continuation of application No. 11/109,088, filed on Apr. 19, 2005, now Pat. No. 7,516,062.

(51) Int. Cl.
*G06F 17/26* (2006.01)
*G10L 11/00* (2006.01)
(52) U.S. Cl. .................. 704/3; 704/2; 704/277
(58) Field of Classification Search ............ 704/2–4, 704/277
See application file for complete search history.

(56) References Cited

U.S. PATENT DOCUMENTS

| | | | |
|---|---|---|---|
| 4,611,996 A | 9/1986 | Stoner | |
| 4,951,202 A | 8/1990 | Yan | |
| 5,309,358 A | 5/1994 | Andrews et al. | |
| 5,319,552 A | 6/1994 | Zhong | |
| 5,444,445 A | 8/1995 | Chu | |
| 5,525,060 A | 6/1996 | Loebner | |
| 5,583,761 A | 12/1996 | Chou | |
| 5,697,789 A | 12/1997 | Sameth et al. | |
| 5,873,111 A | 2/1999 | Edberg | |
| 5,897,630 A | 4/1999 | Schneider Huddleston Virta et al. | |
| 6,022,221 A | 2/2000 | Boon | |
| 6,023,714 A | 2/2000 | Hill et al. | |
| 6,061,646 A | 5/2000 | Martino et al. | |
| 6,073,146 A | 6/2000 | Chen | |
| 6,077,085 A | 6/2000 | Parry et al. | |
| 6,094,666 A | 7/2000 | Li | |
| 6,223,150 B1 | 4/2001 | Duan et al. | |

(Continued)

OTHER PUBLICATIONS

"CEL (Chinese-Engish Lookup)", http://web.archive.org/web/20010309104519/http://iprimus.com.au/richwarm/cel/cel.htm, Mar. 2001.

(Continued)

*Primary Examiner* — David R Hudspeth
*Assistant Examiner* — Justin W Rider
(74) *Attorney, Agent, or Firm* — Yee & Associates, P.C.; William H. Steinberg; Rudolf O. Siegesmund

(57) ABSTRACT

A weighted search program is disclosed. The weighted search program may be integrated into a translation program, or the weighted search program may be used independently with an available search engine. When integrated with the translation program, setting and weighting may be combined in a single search. In one embodiment, the weighting would be used in conjunction with a Pin Yin translation program so that a user could set some terms, and allocate a search weight to the remaining terms. The invention may be applied independently in Internet searching so that a user can apply weights to multiple elements of a search term.

17 Claims, 5 Drawing Sheets

U.S. PATENT DOCUMENTS

| | | | |
|---|---|---|---|
| 6,224,383 | B1 | 5/2001 | Shannon |
| 6,266,668 | B1 | 7/2001 | Vanderveldt et al. |
| 6,314,469 | B1 | 11/2001 | Tan et al. |
| 6,346,990 | B1 | 2/2002 | Watanabe et al. |
| 6,349,147 | B1 | 2/2002 | Pong et al. |
| 6,381,567 | B1 | 4/2002 | Christensen et al. |
| 6,438,515 | B1 | 8/2002 | Crawford et al. |
| 6,522,330 | B2 | 2/2003 | Kobayashi |
| 6,567,973 | B1 | 5/2003 | Yamamoto et al. |
| 6,999,916 | B2 | 2/2006 | Lin et al. |
| 7,051,019 | B1 | 5/2006 | Land et al. |
| 7,165,019 | B1 | 1/2007 | Lee et al. |
| 2001/0019329 | A1 | 9/2001 | Kobayashi |
| 2001/0029542 | A1 | 10/2001 | Nishimura |
| 2001/0037332 | A1 | 11/2001 | Miller et al. |
| 2002/0022953 | A1* | 2/2002 | Bertolus et al. .......... 704/1 |
| 2002/0069047 | A1 | 6/2002 | Ma et al. |
| 2002/0085018 | A1 | 7/2002 | Chien |
| 2002/0123988 | A1 | 9/2002 | Dean et al. |
| 2002/0151366 | A1 | 10/2002 | Walker et al. |
| 2003/0027122 | A1 | 2/2003 | Stansvik |
| 2003/0040899 | A1 | 2/2003 | Ogilvie |
| 2003/0078921 | A1 | 4/2003 | Michael Hsing et al. |
| 2003/0115040 | A1 | 6/2003 | Xing |
| 2003/0180699 | A1 | 9/2003 | Resor |
| 2006/0089928 | A1* | 4/2006 | Johnson .......... 707/4 |

OTHER PUBLICATIONS

Hughes, Arthur. 1/CT3 Computer Science Sampler Paper 1, 1998, University of Dublin, pp. 1-6.

"On-line Chinese Tools", pp. 1-5, retrieved Jan. 9, 2007 http://web.archive.org/web/2002120635901/http://www.mandarintools.com/.

"Pinyin to Unicode", retrieved Jan. 10, 2007 http://web.archive.org/web/20021206035901/http://www.foolsworkshop.com/ptou.

USPTO office action for U.S. Appl. No. 10/631,068 dated May 30, 2006.

USPTO final office action for U.S. Appl. No. 10/631,068 dated Jan. 3, 2007.

USPTO office action for U.S. Appl. No. 10/631,068 dated Jun. 14, 2007.

USPTO final office action for U.S. Appl. No. 10/631,068 dated Nov. 21, 2007.

USPTO office action for U.S. Appl. No. 10/631,068 dated Jan. 26, 2009.

USPTO office action for U.S. Appl. No. 10/617,530 dated Jan. 24, 2007.

USPTO final office action for U.S. Appl. No. 10/617,530 dated May 22, 2007.

USPTO office action for U.S. Appl. No. 10/617,530 dated Oct. 17, 2007.

USPTO office action for U.S. Appl. No. 10/617,530 dated Oct. 28, 2008.

USPTO final office action for U.S. Appl. No. 10/617,530 dated Apr. 8, 2009.

USPTO office action for U.S. Appl. No. 10/617,526 dated Jan. 24, 2007.

USPTO final office action for U.S. Appl. No. 10/617,526 dated May 16, 2007.

USPTO office action for U.S. Appl. No. 10/617,526 dated Oct. 17, 2007.

USPTO office action for U.S. Appl. No. 10/631,070 dated Jan. 24, 2007.

USPTO final office action for U.S. Appl. No. 10/631,070 dated May 15, 2007.

USPTO office action for U.S. Appl. No. 10/631,070 dated Oct. 17, 2007.

USPTO office action for U.S. Appl. No. 11/109,088 dated Jan. 28, 2008.

USPTO final office action for U.S. Appl. No. 11/109,088 dated Jul. 29, 2008.

USPTO notice of allowance for U.S. Appl. No. 11/109,088 dated Nov. 24, 2008.

\* cited by examiner

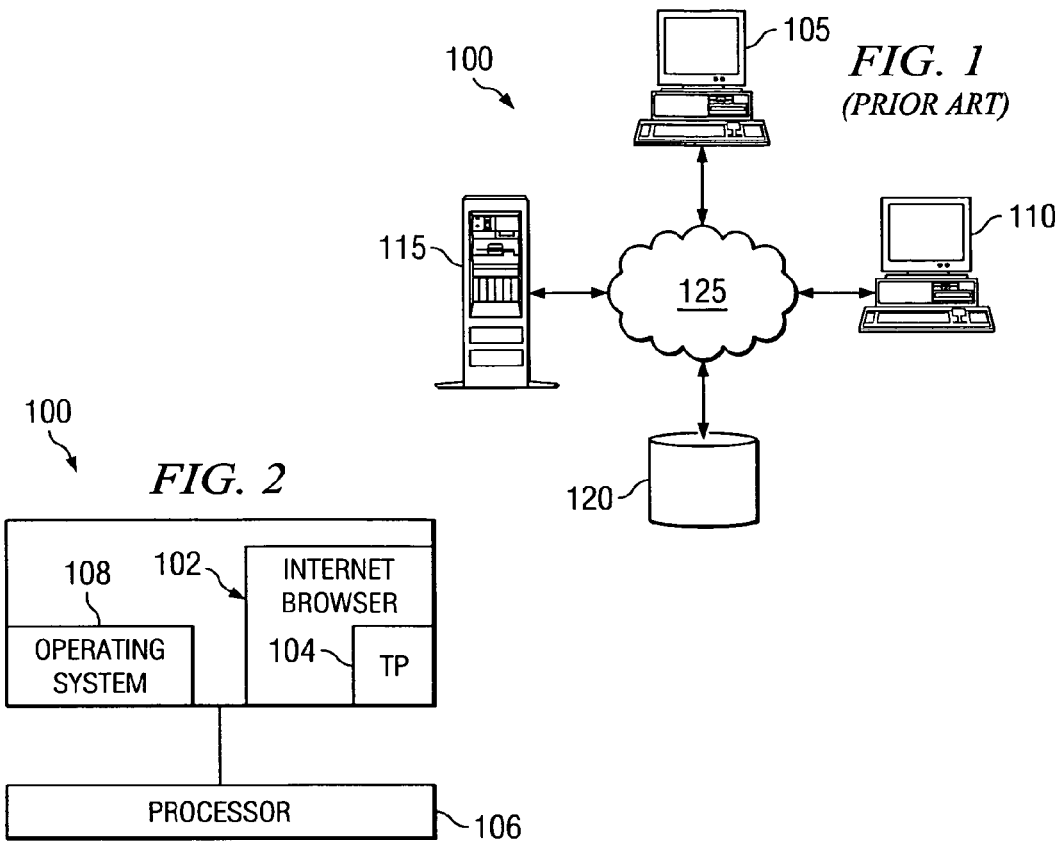
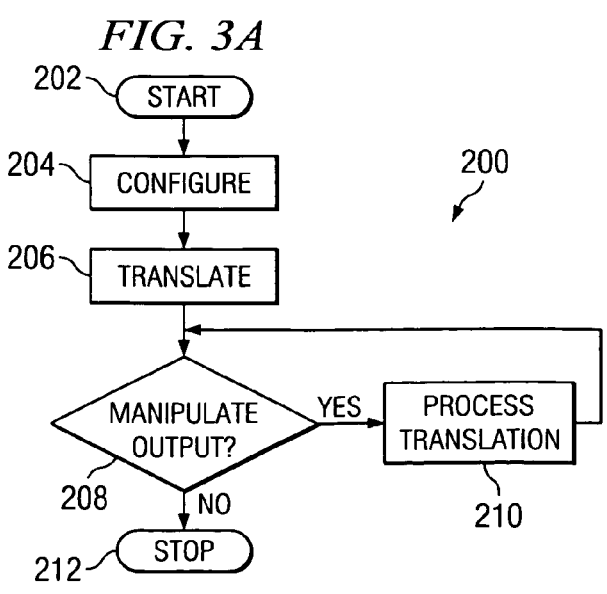
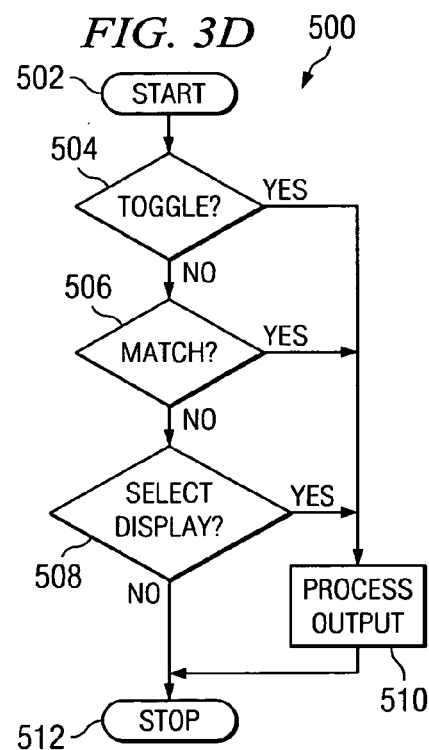

LANGUAGE CONVERTER WITH ENHANCED SEARCH CAPABILITY

CROSS-REFERENCE TO RELATED APPLICATION

The present invention is related to the subject matter of U.S. patent application Ser. No. 11/060,359, "Dynamic Pin Yin Converter with GUI Features for Enhanced Learning," incorporated herein by reference.

This application is a continuation of application Ser. No. 11/109,088, filed Apr. 19, 2005.

FIELD OF THE INVENTION

The present invention is directed to a method for translating from hybrid and unaccented Pin Yin words to Simplified Chinese characters, Traditional Chinese characters, and accented Pin Yin words using an improved translator program with weighted search capability and also to a method of using the weighted search program independently.

BACKGROUND OF THE INVENTION

Sino-Tibetan based languages, such as Chinese, are vastly different from Latin based languages such as English. The Chinese language does not contain an alphabet. Instead, the Chinese language comprises more than 60,000 individual characters. Each character possesses a meaning, unlike letters of the alphabet, and a sound. Each Chinese character also has one of five fundamental tones or inflections. Tone is fundamental to the language. For example, the character whose sound is "ma" can either mean "mother" or "horse" or a "question" depending on the tone Chinese also differs from Latin based languages in the concept of a word. In Chinese, strings of characters do not contain spaces and the interpretation of where one word ends and another starts is entirely based on context. Chinese characters generally retain their meaning when combined with others in a word. If a Chinese character has characters added to it in a string, the meaning of the first character is enhanced, but normally it is not radically changed.

The Peoples' Republic of China (PRC or mainland China) introduced "Pin Yin," a phonetic version of Chinese to help young children learn the language. Pin Yin uses the 26 letters of the English alphabet to indicate the sound of a character. For example, a character can be represented by the letters "ma." The tone is represented by 4 accents over certain vowels, or the absence of an accent. The accented vowels indicate the proper tone and are essential to proper pronunciation of Pin Yin. One technique for inputting Pin Yin that uses only the ASCII characters is based on adding a number after the Pin Yin word to indicate the accent as illustrated in Table 1.

TABLE 1

| Number | Accent | Description | Examples |
|---|---|---|---|
| 1 | ¯ | Level Tone | ā ē ī ō ū |
| 2 | ´ | Rising Tone | á é í ó ú |
| 3 | ˇ | Falling Tone, then Rising Tone | ǎ ě ǐ ǒ ǔ |
| 4 | ` | Falling Tone | à è ì ò ù |
| 5 | (None) | No Change in Tone | a e i o u |

Thus, the word guó is input as guo2, the word mā as ma1, and so forth.

A method for translating between Simplified Chinese characters, Traditional Chinese characters, Pin Yin words, and English words was disclosed in U.S. patent application Ser. No. 10/617,526, entitled "Chinese Character/Pin Yin/English Translator" (the '526 application). The translation program of the '526 application is set forth in FIG. 1 through FIG. 3D. In FIG. 3D, the '526 application disclosed searching for words containing one or more characters. Specifically, the '526 application disclosed freezing one or more characters in a search term, changing the unfrozen character, and then performing a search. What is needed beyond the disclosure of the '526 patent is a further ability to apply weights to the characters to be searched. Moreover, a need exists for a weighted search capability that can be used independently of the translation program.

SUMMARY OF THE INVENTION

The invention that meets the need described above is a weighted search program. The weighted search program may be integrated into a translation program, or the weighted search program may be used independently with an available search engine. When integrated with the translation program, setting and weighting may be combined in a single search. In one embodiment, the weighting would be used in conjunction with a Pin Yin translation program so that a user could set some terms, and allocate a search weight to the remaining terms. In another embodiment, the invention may be applied independently in Internet searching so that a user can apply weights to multiple elements of a search term.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 1 is an illustration of a computer network used to implement the present invention;

FIG. 2 is an illustration of the memory containing programs to implement a prior translator program;

FIG. 3A is an illustration of the overall logic of the Translator Program (TP);

FIG. 3D is an illustration of the logic of the process output state of the Translator Program (TP);

DETAILED DESCRIPTION OF THE PREFERRED EMBODIMENT

Figure 3B:
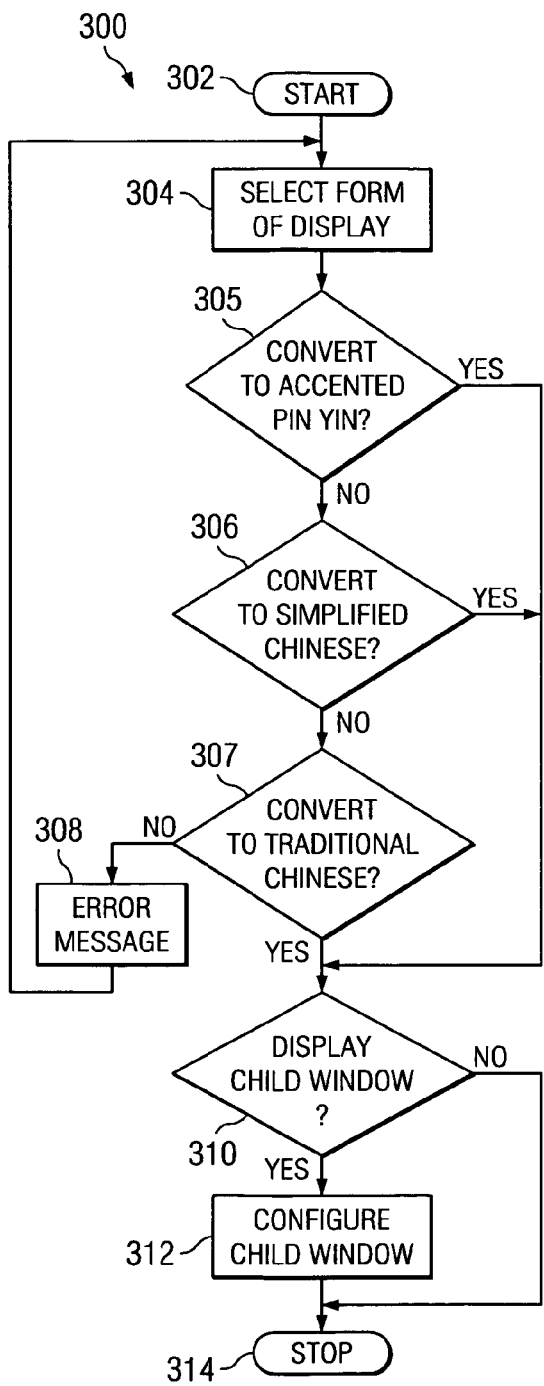
FIG. 3B is an illustration of the logic of the user configuration state of the Translator Program (TP)

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to in a first embodiment as the Enhanced Translator Program (ETP) and in a second embodiment as the Search Term Weighting Program (STWP).

Additionally, the prior Translator Program (TP), the Enhanced Translator Program (ETP) and the Search Term Weighting Program (STWP) are described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Translator Program (TP) 104 typically is stored in a memory, represented schematically as memory 100 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 100. As depicted in FIG. 2, though, memory 100 may include additional data and programs. Of particular import to TP 104, memory 100 includes Internet Browser Program 102 and operating system (OS) 108 with which TP 104 interacts.

As used herein, the term "accented Pin Yin" means the Pin Yin phonetic version of the Chinese language with proper accents over the appropriate Roman letters. As used herein, the term "hybrid Pin Yin" means the Pin Yin phonetic version of the Chinese language without proper accents over the appropriate Roman letters, but instead with numbers in or at the end of the word to represent the accent marks. As used herein, the term "unaccented Pin Yin" means the Pin Yin phonetic version of the Chinese language without proper accents over the appropriate Roman letters. As used herein, "translation" or "translating" means conversion from hybrid Pin Yin, unaccented Pin Yin, or accented Pin Yin into traditional Chinese characters or Simplified Chinese characters, and vice versa, and conversion from unaccented or hybrid Pin Yin into accented Pin Yin, and vice versa.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by the Internet browser 102, which executes TP 104. Translator Program 104 can be in the form of Java Script executed by an Internet browser, in the form of a plug-in to an Internet browser, in the form of a Java program executed by an Internet browser, or in the form of any other program, routine, subroutine, or thread executed by an Internet browser. TP 104 is adapted for integration with displayed web pages so that it may receive input identified on a displayed web page. As part of the present invention, the memory 100 can be configured with the Internet browser 102. Processor 106 can execute the instructions contained in TP 104. Further configurations of TP 104 across various Internet browsers are known by persons skilled in the art.

TP 104 is a set of computer instructions which translates between hybrid or unaccented Pin Yin and Simplified Chinese characters, Traditional Chinese characters or accented Pin Yin, and that is adapted for integration with an existing Internet browser. TP 104 comprises a Navigation Program (NP) 200, a Display Configuration Program (DCP) 300, Language Conversion Program (LCP) 400, and Process Configuration Program (PCP) 500. Flowcharts of the logic of these TP 104 components are illustrated in FIG. 3A, FIG. 3B, FIG. 3C and FIG. 3D.

Navigation Program (NP) 200 is illustrated in FIG. 3A. NP 200 starts (202) when the user accesses the web page. The user may choose to run Display Configuration Program (DCP) 300 (204) (see FIG. 3B). DCP 300 allows the user to select the type of web page to be used for input identification, and to choose the form of Chinese to be output and how the output will be displayed. The user may choose Language Conversion Program (LCP) 400 (206) (see FIG. 3C). LCP 400 accepts Pin Yin input from the user, converts the Pin Yin input to the form of Chinese selected in DCP 300, and displays the output. The user may choose to manipulate the output (208) from LCP 400 using Process Configuration Program (PCP) 500 (see FIG. 3D). If not, NP 200 stops (212).

FIG. 3B depicts a flow chart of DCP 300. DCP 300 starts (302) and the user selects the form of display (304). The user may choose a web page provided by TP 104, or the user may choose to use any existing web page for which TP 104 is adapted to receive identified input. Next, the user can choose to have LCP 400 convert from unaccented or hybrid Pin Yin to accented Pin Yin (305). In that case, LCP 400 converts only the intonation mark and not the entire character. This configuration allows beginners to Chinese to become more familiar with Pin Yin, and with the correct intonation marks of words. Alternatively, the user can choose conversion into Simplified Chinese characters (306) or into Traditional Chinese characters (307). If none of the foregoing selections is made, then an error message is displayed (308) and DCP 300 returns to step 304. Next, the user chooses whether to generate a child window for an additional display relating to the currently translated Chinese characters (310). If the user chooses to have the additional display, the user configures the child window (312). The user can choose to have the characters displayed in traditional format, from top to bottom and right to left, or in modern format, from left to right and top to bottom.

Figure 3C:
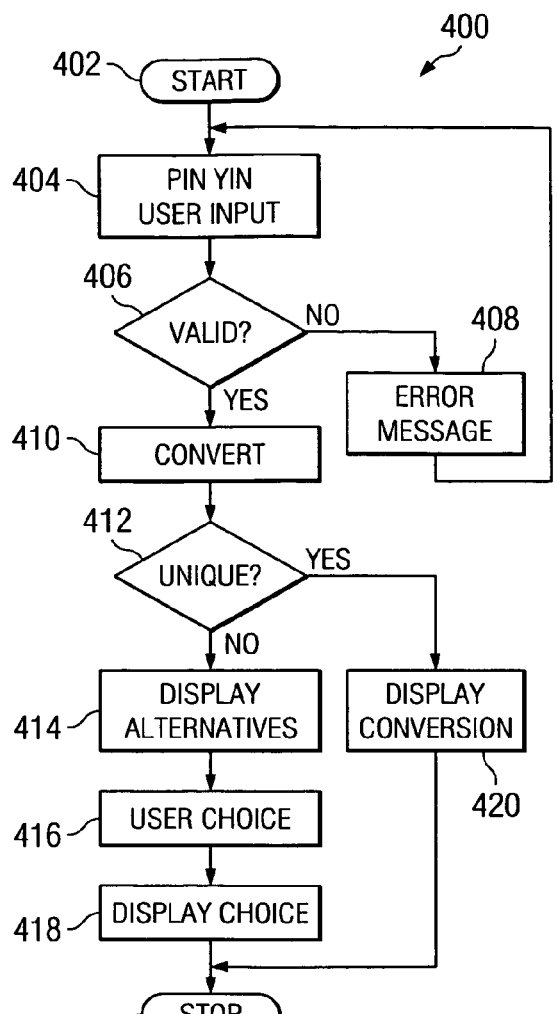
FIG. 3C is an illustration of the logic of the Pin Yin translation phase of the Translator Program (TP)

FIG. 3C depicts a flowchart of LCP 400. LCP 400 starts (402) and the user performs input identification (404). Input may be identified by the user in one of two ways. First, the user may enter input into an existing input field in a displayed web page using an existing input device such as a keyboard. In the first method of entering input, the user may use the translator program's own web page, or the user may use an input field on any displayed web page. Second, the user may highlight words on a displayed web page. As used herein, the term "input identification" means using a designated cursor movement or a designated user action to trigger application of language conversion. One example of a specified movement is highlighting from right to left. Therefore, if an input is typed into an input field, the input may be highlighted from right to left to trigger application of language conversion. Correspondingly, where a desired input is already displayed on a web page, a user may highlight the displayed characters from right to left to trigger language conversion. Persons skilled in the art will be aware of a variety of different cursor movements or user actions suitable for specification as a trigger to activate language conversion. The PinYin input can be a hybrid or unaccented PinYin word, or a period to indicate the end of a sentence. LCP 400 checks the input (406). If the input is an invalid Pin Yin word, LCP 400 displays an error message (408) and LCP 400 returns to step 404, waiting for additional input. If the input is a valid PinYin word, LCP 400 converts the character into another form and displays the translation (410). The translation can be from hybrid or unaccented Pin Yin to accented Pin Yin, Simplified Chinese or Traditional Chinese. LCP 400 can apply context or word logic to determine the proper conversion. LCP 400 can take adjacent characters into account and make use of dictionaries. If the input is a period, indicating the end of a sentence, LCP 400 again uses context or word logic to achieve a conversion. Next, LCP 400 determines whether the conversion is unique (412). As used herein, "unique" means that there is only one possible conversion. If conversion is unique, LCP 400 displays the conversion (420). If the input has multiple possible conversions, LCP 400 displays the alternatives (414). If alternatives are displayed to the user, the user chooses one (416) and LCP 400 displays the chosen alternative (418) A limited subset of Chinese characters, perhaps 3,000 to 5,000 would be suitable for the disambiguation of most characters. In this embodiment of the invention, character disambiguation is performed at the end of each sentence. In an alternate embodiment of the invention, the user may resolve any ambiguity character by character. In the alternate embodiment, all of the disambiguation is performed by LCP 400. In a further alternate embodiment of the invention, server 115 uses dictionaries to disambiguate at the end of a sentence thereby limiting the number of round trips over Internet 125 between server 115 and the user's computer.

FIG. 3D depicts a flow chart of PCP 500. PCP 500 starts (502), and the user chooses to manipulate the output produced by LCP 400. The user may choose to toggle between the original and the newly displayed character by highlighting (504). For example, LCP 400 may be configured so that when text is highlighted by moving the cursor from right to left over an original text, JavaScript® will detect the highlight event, and the original text will replaced by the translated character. Correspondingly, when the cursor is moved from left to right over the translated character, JavaScript® detects the highlight event, and the original text will reappear. The user may choose a match feature where LCP 400 is integrated with a match capability using a backend dictionary (506). If the user selects the match capability, the user may select a character or characters, and search for words containing those characters. The user can perform a search based on a modified character, freezing the other characters already displayed. For example, if three characters are being displayed, the user can freeze the first and third characters, change the second character, and then perform a search. The user does not have to delete the third character and the second character, and replace both. One method of freezing would be to highlight the group of three characters and then to change one of the characters. The user may choose to display characters selected by the user from the LCP 400 output in a child or side window (508). Based on the foregoing selections, the user may process (manipulate) the output (510). The user may select the characters in the output by highlighting them, or by inserting a specified delimiter. In the latter case, all characters on one side of the delimiter are displayed in the child or side window. A newline ASCII character can serve as the delimiter. At the option of the user, these selected characters can either replace the characters already on display in the child or side window, or they can be in addition to the characters already on display there. In the latter case, many display arrangements are possible. They can be shown on a new line, or inserted at the end of the current display.

The prior Translator Program presents a very fast, effective method for inputting Chinese. It is fast, because not much time is spent on going back and forth to the server. Most of the work is done on the local computer. It is effective. The user sees each accented Pin Yin word or Chinese character as he enters the PinYin equivalent, and has considerable flexibility in modifying the output as desired. Further, the use of word context to disambiguate allows the timesaving use of entry of unaccented Pin Yin to produce the desired Chinese characters. The interactive nature of the invention greatly enhances usability, and improves learning time for students of the language. Language students can see the Chinese or accented Pin Yin words immediately after they enter their input.

Other embodiments of the prior translator program apply to other languages with a similar structure. An embodiment of the prior translator program accepts the Zhu Yin input of traditional Chinese, and produces traditional Chinese characters. More generally, other embodiments of the prior translator program apply for the rapid, interactive entry of generalized computer structures, when the structures have components that can be described with keyboard characters. In these other embodiments, the user inputs the keyboard characters corresponding to components. The components are then displayed, one component at a time, rapidly and interactively. The user can also manipulate the output, replacing or rearranging components, to produce the desired structures.

Figure 3E:
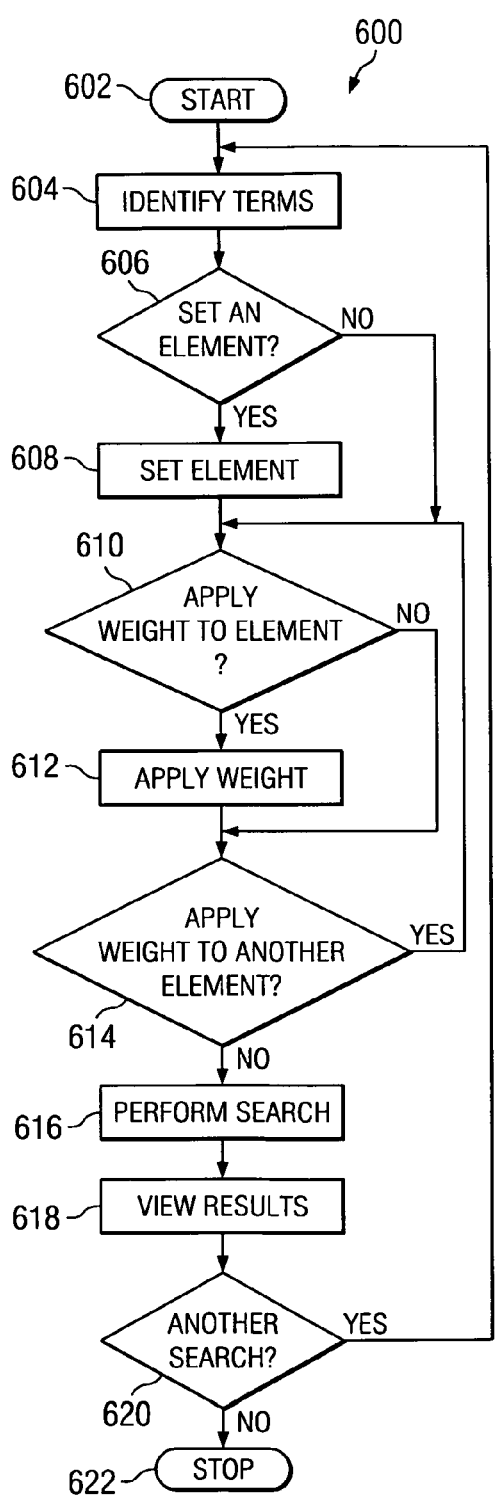
FIG. 3E is an illustration of the logic of a combined setting and weighting program as part of an Enhanced Translator Program (ETP)

FIG. 3E depicts the logic of Search Program (SP) 600 which together with the above described TP 104 comprises Enhanced Translator Program (ETP) 105. SP 600 starts (602) and the user identifies a search term with multiple character elements (604) in any of the ways described above. A determination is made whether the user wants to set a character element of the search term (606). Setting a character element means that the character element will be considered for the context it provides to the companion characters in the search term, but no search will be conducted for that individual term. If a character element is to be set, SP 600 sets the character element, and if not, goes to step 610. A determination is made whether the user desires to apply weight to a character element (610). If so, the user selects the weight to be applied, and if not, SP 600 goes to step 614. Next, a determination is made whether a weight is to be applied to another character element (614). If so, SP 600 goes to step 610, and if not, SP 600 performs the search (616). The search results are displayed (618). A determination is made whether another search is desired (620). If so, SP 600 goes to step 604, and if not, SP 600 stops (622).

Figure 4A:
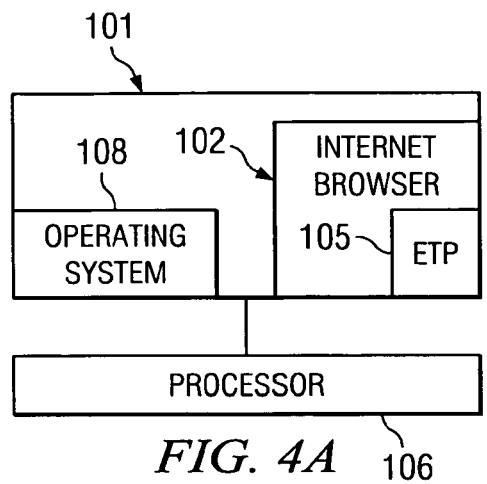
FIG. 4A is an illustration of a memory containing programs to implement an Enhanced Translator Program (ETP) of the present invention.
Figure 4B:
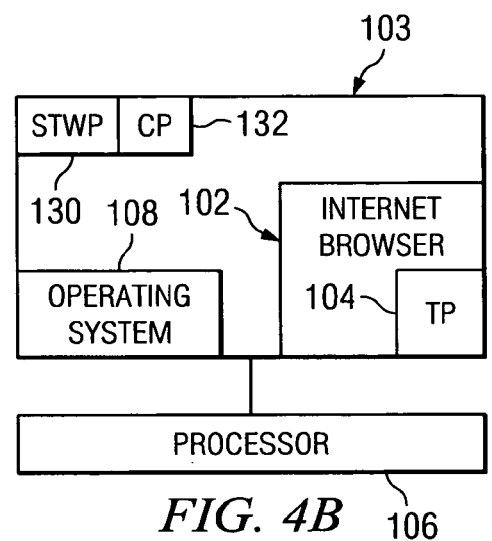
FIG. 4B is an illustration of a memory containing the independent Search Term Weighting Program (STWP) of the present invention.

FIG. 4A illustrates a memory containing programs to implement the Enhanced Translator Program (ETP) and FIG. 4B illustrates a memory containing the independent Search Term Weighting Program (STWP). FIG. 4A is the same as FIG. 2 except that TP 104 is replaced with ETP 105. FIG. 4B is the same as FIG. 2 except that two new programs are added. The first new program is independent Search Term Weighting Program (STWP) 130 and the second new program is Configuration Program (132). STWP 130 will be discussed with respect to FIG. 6 below and CP 132 will be discussed with respect to FIG. 7 below.

Figure 5:
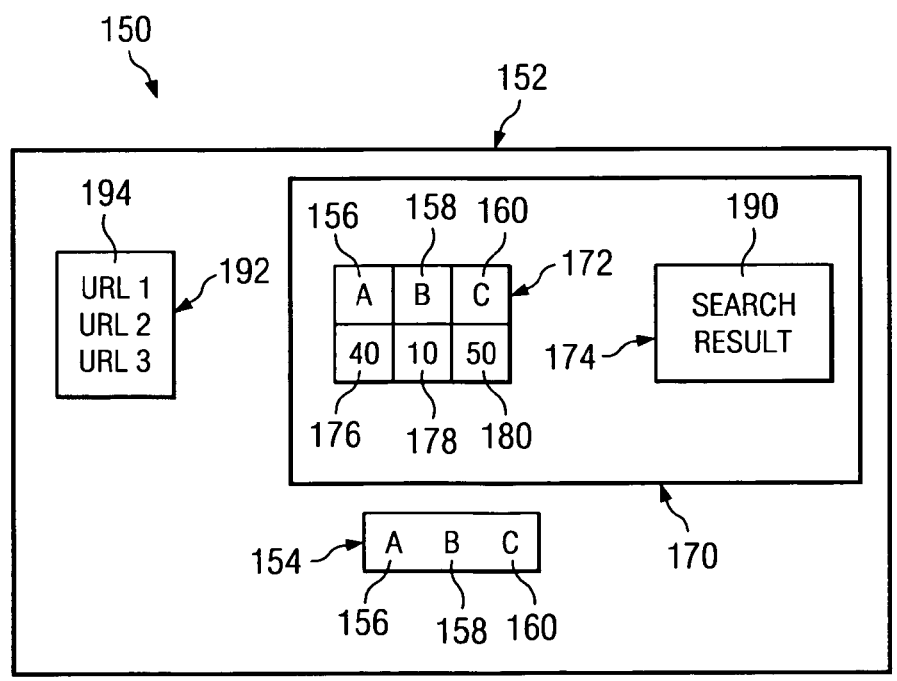
FIG. 5 is an illustration of a web page with a first child windows displaying consolidated Uniform Resource Locator (URL) addresses and a second child window displaying a weighted search of the present invention.

FIG. 5 illustrates an interface 150 for employing STWP 130 comprising web page 152 with first child window 194 displaying consolidated Uniform Resource Locator (URL) addresses and second child window 170 displaying a weighted search. Search term area 154 contains representative search terms A 156, B 158 and C 160. The search terms may be selected in any of the ways discussed for selection of search terms in regard to utilization of prior TP 104. Once selected, the search terms will be displayed in second child window 170 in weighted search table 172. In the example of FIG. 5, representative search terms A 156, B 158 and C 160 automatically populate the upper row in three columns of weighted search table 172. The user may then select a weight to be displayed beneath each of the search terms. In the example of FIG. 5, A 156 is assigned a weight of 40 percent, B 158 is assigned a weight of 10 percent, and C 160 is assigned a weight of 50 percent. After the user completes assignment of weights to each search term, the user activates the search and search result 190 appears in search result field 174.

Figure 6:
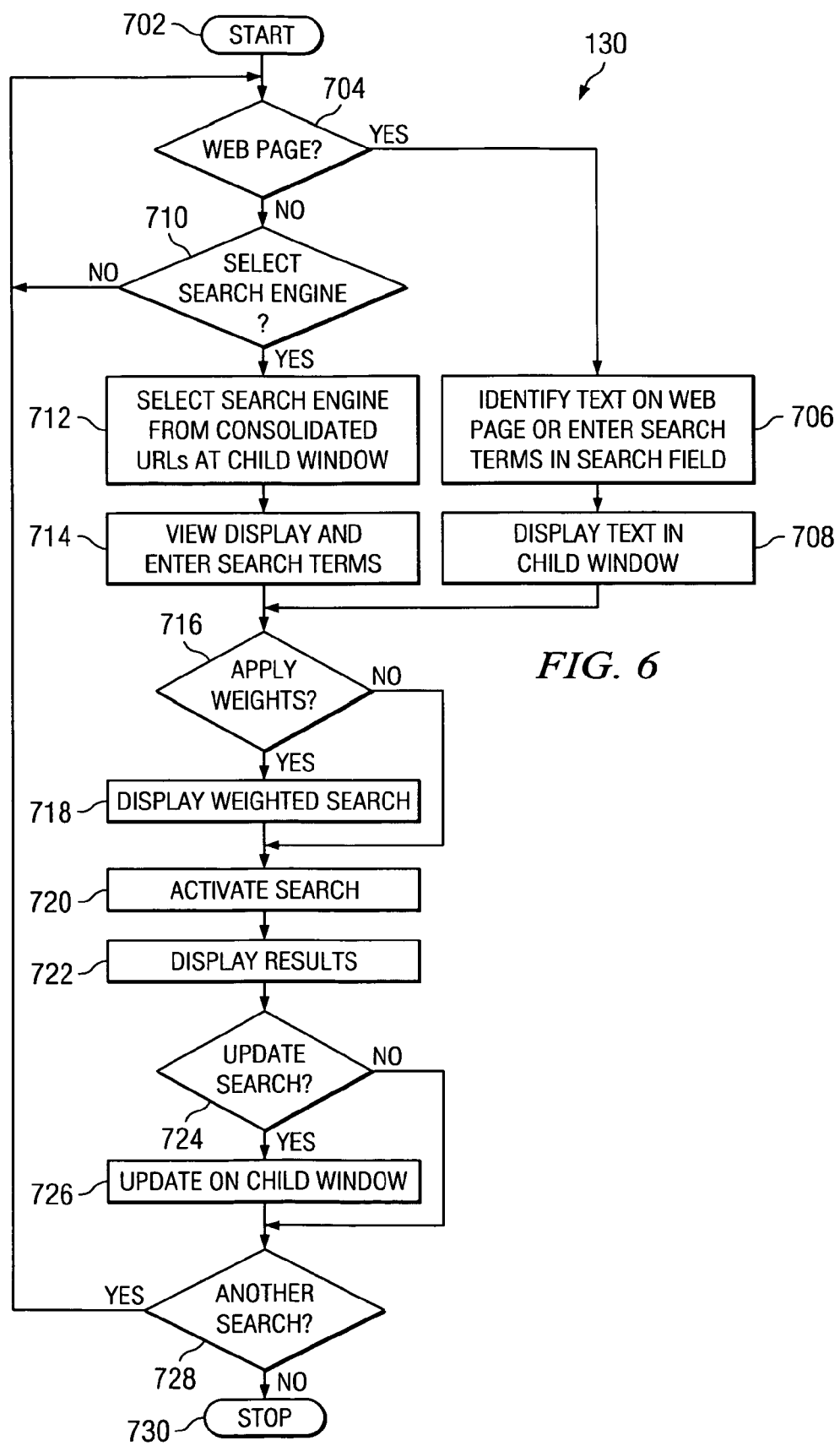
FIG. 6 is an illustration of the logic of the independent Search Term Weighting Program (STWP) of the present invention.

FIG. 6 illustrates the logic of independent Search Term Weighting Program (STWP) 130. STWP 130 starts (702) and if a search is desired (704), then the user chooses between using the web page interface or an existing search engine. First, a determination is made whether the user wants to employ the web page interface (704). If the user wants to employ the web page interface, then the user either identifies text containing search terms on the web page, or enters the search terms in the search field. The text containing the search terms is displayed in a child window (708), and STWP 130 goes to step 716. If the user did not select the web page at step 704, a determination is made whether the user wants to select a search engine (710). If not, STWP 130 goes back to step 704 until one of the two choices is made. If the user elects to select a search engine, the user makes a selection from a list of consolidated search engine URLs at a child window (712). The user views the displayed search engine, and enters the search terms. Next, a determination is made whether the user desires to apply weights (716). If not, the search is activated (720). If the user wants to apply weights to the search terms, the weighted search is displayed (718), and the search is activated (720). The search results are displayed (722). A determination is made whether the user wants to update the search (724). If so, the user updates the search on the child window (726). If not, a determination is made whether another search is desired (728). If another search is desired, STWP 130 goes to step 704, and if not, STWP 130 stops (730).

Figure 7:
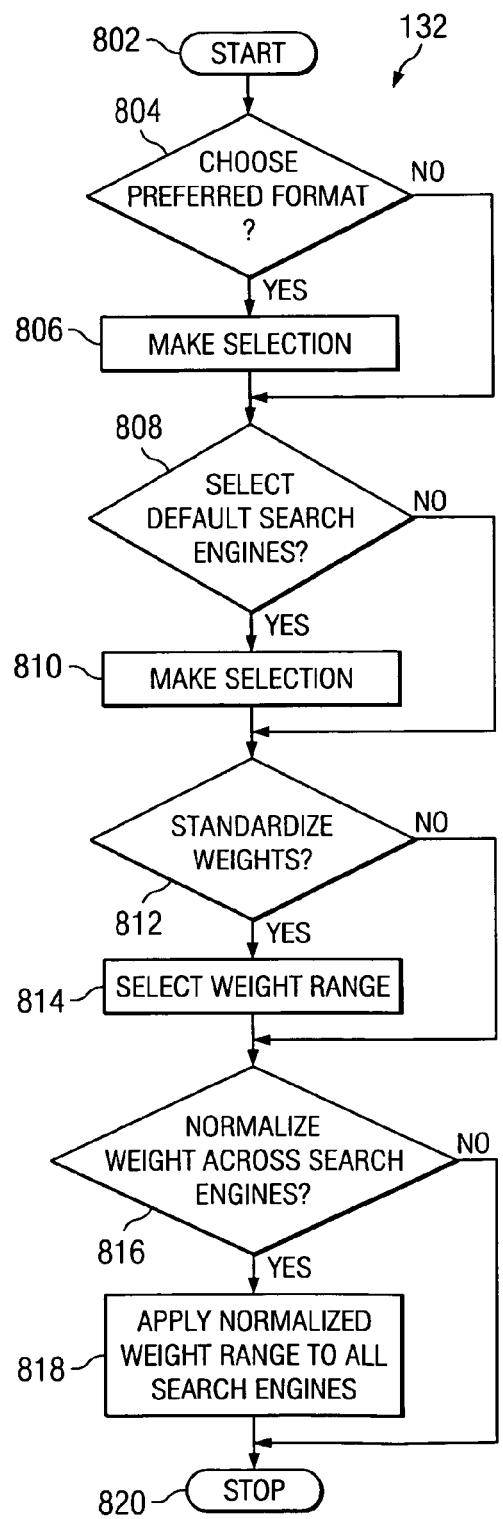
FIG. 7 is an illustration of a configuration program (CP) for the Search Term Weighting Program (STWP) of the present invention.

FIG. 7 illustrates the logic of Configuration Program (CP) 132 which allows the user to make certain choices regarding STWP 130. CP 132 starts (802) and the user decides whether to choose a preferred format (804). If so, the user makes a selection (806), and if not, a determination is made whether to select a default search engine (808). If so, the user selects a search engine that will automatically appear (810). If the user desires to standardize the weights to be applied (812), the user selects a weight range (814). If not, a determination is made whether the user desires to normalize weights across the available search engines (816). If so, the user applies the weight range to all available search engines (818). If not, CP 132 stops (820).

In either ETP 105 or STWP 130, default values may be provided for search weights. For example, a user may configure weights to be applied using the sequence of search criteria so that when there are four search terms, a pre-determined search weight would be applied to each of the four terms in accordance with their order. STWP 130 may be implemented as a module that plugs into a web browser without further installation. Additionally, a rating engine and rating data base may be provided for use with STWP 130 to further enhance search capability. The rating engine may be a stand-alone mechanism residing on a central server and acting as a proxy or gateway between the user interface and the search engine. The function of the rating engine is to monitor the selection of search results by a plurality of users, where each of the users entered the same search terms, and to calculate a rating to apply to result or results selected by all of the users. For example, if a user enters a set of search terms, and all of the users that entered that same set of search terms chose the fourth search result, the rating engine would apply a rating to the fourth search result. The rating would cause the fourth search result to display first when the next user enters the same set of search terms. The user data correlating search terms and common result selections among a plurality of users may be stored in a ratings database. Two or more such ratings databases may be shared across search engines. The rating engine can access the ratings database to continuously aggregate user data and re-calculate the rating for each set of commonly used search terms. Alternatively, the rating engine could be localized so that common result selections are not shared across ratings databases, but are applied to users at a single address.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A system comprising:
   a computer connected to a computer readable memory, a non-transitory computer readable storage medium, and to the Internet;
   first program instructions for receiving a search term;
   second program instructions for receiving a designation of a character in the search term as a set character;
   third program instructions for automatically designating, responsive to receiving the designation, all other characters in the search term as a plurality of companion characters so that the set character will be considered only for a context that the set character provides to the plurality of companion characters and will not itself be translated;

fourth program instructions for searching a translation dictionary for a plurality of translation results in accordance with the context that the set character provides to the plurality of companion characters; and fifth program instructions for displaying the plurality of translation results in a display connected to the computer;

wherein the first through the fifth program instructions are stored in the non-transitory computer readable storage medium for running via the computer readable memory.

2. The system of claim 1 further comprising:

sixth program instructions for entering, responsive to receiving a selection of a plurality of characters from a text on web page, the plurality of characters in a child window display where a weight can be assigned to each of the plurality of characters, a search activated, and a search result displayed;

wherein the sixth program instructions are stored in the non-transitory computer readable storage medium for running via the computer readable memory.

3. The system of claim 1 further comprising:

seventh program instructions for receiving a selection of a search engine from a list of uniform resource locator addresses displayed at a child window, and the search term and applying a weight to each of the plurality of companion characters to be searched, so that a search is performed in accordance with the weight applied to each of the plurality of companion characters;

wherein the seventh program instructions are stored in the non-transitory computer readable storage medium for running via the computer readable memory.

4. The system of claim 3 further comprising:

eighth program instructions for providing a display for each of a plurality of companion characters entered in the search engine so that the weight can be assigned to each of the plurality of companion characters;

wherein the eighth program instructions are stored in the non-transitory computer readable storage medium for running via the computer readable memory.

5. The system of claim 3 wherein the first through the eighth program instructions are configured to receive an identification of a text anywhere on a web page, to add the text to a child window, and to display a sequence of data selected for the search and the weight assigned to each of the companion characters.

6. The system of claim 1 wherein first through the eighth program instructions are integrated into an enhanced translation program.

7. The system of claim 1 wherein the first through the eighth program instructions are configured to operate independently with an existing search engine.

8. The system of claim 1 wherein the first through the eighth program instructions are configured for operation from any web page by turning the web page mode to search.

9. The system of claim 1 wherein the first through the eighth program instructions display a plurality of consolidated search engine uniform resource locators at a child window, display selected search terms in a parent window, send the search terms to a selected search engine, and return a result in the parent window.

10. The system of claim 1 wherein the first through the eighth program instructions apply a weight to a selected text on a web page.

11. The system of claim 1 wherein the first through the eighth program instructions apply a weight to a selected text in a search field.

12. The system of claim 1 wherein the first through the eighth program instructions standardize a plurality of weights.

13. The system of claim 1 wherein the first through the eighth program instructions normalize a plurality of weights across a plurality of search engines.

14. A method comprising:

receiving, by a processor of a computer, a search term;

receiving a designation of a character in the search term as a set character;

responsive to receiving the designation, automatically designating all other characters in the search term as a plurality of companion characters so that the set character will be considered only for a context that the set character provides to the plurality of companion characters and will not itself be translated;

searching a translation dictionary for a plurality of translation results in accordance with the context that the set character provides to the plurality of companion characters; and applying a weight to each of the plurality of companion characters, so that a search is performed in accordance with the weight applied to each of the plurality of companion characters;

displaying the plurality of translation results in a display connected to the computer.

15. The method of claim 14 further comprising:

wherein when the plurality of companion characters are hybrid Pin Yin characters, unaccented Pin Yin characters, or accented Pin Yin characters, the plurality of companion characters are translated into Traditional Chinese characters or into Simplified Chinese characters, and when the plurality of companion characters are Traditional Chinese characters or Simplified Chinese characters, the plurality of companion characters are translated into hybrid Pin Yin characters, into unaccented Pin Yin characters or into accented Pin Yin characters.

16. The method of claim 15 further comprising:

responsive to entry of a plurality of percentages in a child window of a web page, each percentage corresponding to one of the plurality of companion characters, searching a translation dictionary for a plurality of translation results in accordance with the user assigned numerical percentage for each of the plurality of companion characters and in accordance with the context that the set character provides to the plurality of companion characters.

17. A computer program product for using context and weights to translate a search term displayed in a web page from hybrid Pin Yin, unaccented Pin Yin, or accented Pin Yin into Traditional Chinese or Simplified Chinese, or to translate the search term from Traditional Chinese or Simplified Chinese into hybrid Pin Yin, unaccented Pin Yin or accented Pin Yin, the computer program product comprising:

a non-transitory computer readable storage medium;

first program instructions for designating, responsive to a user highlighting the search term in the web page and responsive to the user designating a character in the search term as a set character, all other characters in the search term as a plurality of companion characters so that the set character will be considered only for a context that the set character provides to the plurality of companion characters and will not itself be translated;

second program instructions for displaying each of the companion characters in a first child window of the web page;

third program instructions for searching, responsive to the user entering a plurality of user assigned percentages in a second child window of the web page, each user assigned percentage corresponding to one of the plurality of companion characters, a translation dictionary for a plurality of translation results in accordance with the user assigned numerical percentage for each of the plurality of companion characters and in accordance with the context that the set character provides to the plurality of companion characters;

fourth program instructions for displaying the plurality of translation results in a third child window of the web page;

wherein a sum of the plurality of user assigned percentages is one hundred percent;

wherein, when each of the plurality of companion characters has a different user assigned percentage, the plurality of translation results are displayed in an order corresponding to a size of the user assigned percentage for each of the plurality of companion characters; and wherein when the plurality of companion characters are hybrid Pin Yin characters, unaccented Pin Yin characters, or accented Pin Yin characters, the plurality of companion characters are translated into Traditional Chinese characters or into Simplified Chinese characters, and when the plurality of companion characters are Traditional Chinese characters or Simplified Chinese characters, the plurality of companion characters are translated into hybrid Pin Yin characters, into unaccented Pin Yin characters or into accented Pin Yin characters; and wherein the first through the fourth program instructions are stored on the non-transitory computer readable storage medium.

\* \* \* \* \*